(12) United States Patent
Onishi et al.

(10) Patent No.: US 7,929,811 B2
(45) Date of Patent: Apr. 19, 2011

(54) HANDWRITTEN INFORMATION MANAGEMENT SYSTEM, HANDWRITTEN INFORMATION MANAGEMENT METHOD AND RECORDING MEDIUM STORING HANDWRITTEN INFORMATION MANAGEMENT PROGRAM

(75) Inventors: Takeshi Onishi, Kanagawa (JP); Takashi Sonoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 671 days.

(21) Appl. No.: 12/045,211

(22) Filed: Mar. 10, 2008

(65) Prior Publication Data
US 2009/0087017 A1    Apr. 2, 2009

(30) Foreign Application Priority Data

Sep. 27, 2007    (JP) .................................. 2007-251399

(51) Int. Cl.
*G06K 9/00*    (2006.01)
(52) U.S. Cl. ......... 382/312; 382/175; 382/186; 382/291
(58) Field of Classification Search ................... 382/186
See application file for complete search history.

(56) References Cited

U.S. PATENT DOCUMENTS

| | | | | |
|---|---|---|---|---|
| 5,509,083 A | * | 4/1996 | Abtahi et al. | 382/124 |
| 5,581,630 A | * | 12/1996 | Bonneau, Jr. | 382/116 |
| 5,598,474 A | * | 1/1997 | Johnson | 713/186 |
| 5,680,460 A | * | 10/1997 | Tomko et al. | 713/186 |

FOREIGN PATENT DOCUMENTS

| | | |
|---|---|---|
| JP | A-2003-511761 | 3/2003 |
| JP | A-2005-235185 | 9/2005 |
| JP | A-2006-085679 | 3/2006 |

* cited by examiner

*Primary Examiner* — Yosef Kassa
*(74) Attorney, Agent, or Firm* — Oliff & Berridge, PLC

(57) ABSTRACT

A handwritten information management system, which includes a paper sheet document generation section that generates a paper sheet document in which plurality pieces of coded information including coordinate information indicating a position on a paper sheet and document identification information of the paper sheet document formed on the paper sheet are recorded; a paper sheet document registration section that registers the generated paper sheet document and an electronic document corresponding to the paper sheet document correlated with the document identification information; a handwritten information detection section that detects handwritten information handwriting on the generated paper sheet document; a handwritten information registration section that registers handwritten information identification information to identify the handwritten information correlated with the detected handwritten information; and an identification information management section that manages the document identification information and the handwritten information identification information.

10 Claims, 16 Drawing Sheets

IDENTIFICATION INFORMATION MANAGEMENT SERVER

| PAPER SHEET ID | OUTPUT DATE AND TIME | DOCUMENT ID | HANDWRITING ID | HANDWRITING DATE AND TIME | HANDWRITING USER |
|---|---|---|---|---|---|
| 0201 | 06-Jul-2007 12:45 | 0101 | 0301 | 07-Jul-2007 13:05 | DENSHI TARO |
| | | | 0302 | 07-Jul-2007 14:06 | TOKKYO JIRO |
| 0202 | 06-Jul-2007 12:50 | 0102 | 0303 | 07-Jul-2007 15:21 | TOKKYO JIRO |
| ... | ... | ... | ... | ... | ... |

<SELECTION OF DOCUMENT TO BE OUTPUTTED>

| PAPER SHEET ID | OUTPUT DATE AND TIME | DOCUMENT ID | HANDWRITING ID | HANDWRITING DATE AND TIME | HANDWRITING USER |
|---|---|---|---|---|---|
| 0201 | 06-Jul-2007 12:45 | 0101 | 0301 | 07-Jul-2007 13:05 | DENSHI TARO |
| 0202 | 06-Jul-2007 12:50 | 0102 | 0302 | 07-Jul-2007 14:06 | TOKKYO JIRO |
| | | | 0303 | 07-Jul-2007 15:21 | TOKKYO JIRO |
| ... | ... | ... | ... | ... | ... |

- 1201 SELECT PAPER SHEET ID
- 1202 SELECT DOCUMENT ID
- 1203 SELECT HANDWRITING ID
- 1204 ⇦
- 1205 ⇨
- 1206 SET
- 1207 RESET
- APPLY
- OK
- CANCEL

HANDWRITTEN INFORMATION MANAGEMENT SYSTEM, HANDWRITTEN INFORMATION MANAGEMENT METHOD AND RECORDING MEDIUM STORING HANDWRITTEN INFORMATION MANAGEMENT PROGRAM

CROSS-REFERENCE TO RELATED APPLICATION

This application is based on and claims priority under 35 USC 119 from Japanese Patent Application No. 2007-251399 filed on Sep. 27, 2007.

BACKGROUND

1. Technical Field

The present invention relates to a handwritten information management system, a handwritten information management method and a recording medium storing a handwritten information management program.

2. Related Art

In recent years, documents have been handled in an electronic form in offices. Additionally, on paper sheets outputted by an image formation device, various kinds of information are frequently written with handwriting using writing utensils and the like.

Correspondingly there have been developed various techniques for managing those kinds of handwritten information written with handwriting in the electronic form.

SUMMARY

An aspect of the present invention provides a handwritten information management system, which includes a paper sheet document generation section that generates a paper sheet document in which a plurality of pieces of coded information including coordinate information indicating a position on a paper sheet and document identification information of the paper sheet document formed on the paper sheet are recorded; a paper sheet document registration section that registers the paper sheet document generated by the paper sheet document generation section and an electronic document corresponding to the paper sheet document in correlation with the document identification information; a handwritten information detection section that detects handwritten information handwriting on the paper sheet document generated by the paper sheet document section; a handwritten information registration section that registers handwritten information identification information to identify the handwritten information in correlation with the handwritten information detected by the handwritten information detection section; and an identification information management section that manages the document identification information correlated with the paper sheet document registered by the paper sheet document registration section and the handwritten information identification information correlated with the handwritten information registered by the handwritten information registration section.

BRIEF DESCRIPTION OF THE DRAWINGS

An exemplary embodiment of the present invention will be described in detail based on the following figures, wherein:

FIG. 7 is a table showing information stored in an identification information storage section 305 in the identification information management server 30;

FIG. 12 is a screen configuration diagram showing an output document selection screen;

DETAILED DESCRIPTION

Hereinbelow, an example of the present invention will be described in detail with reference to the attached drawings.

Firstly, a handwritten information management system 70 will be described with reference to FIG. 1.

Figure 1:
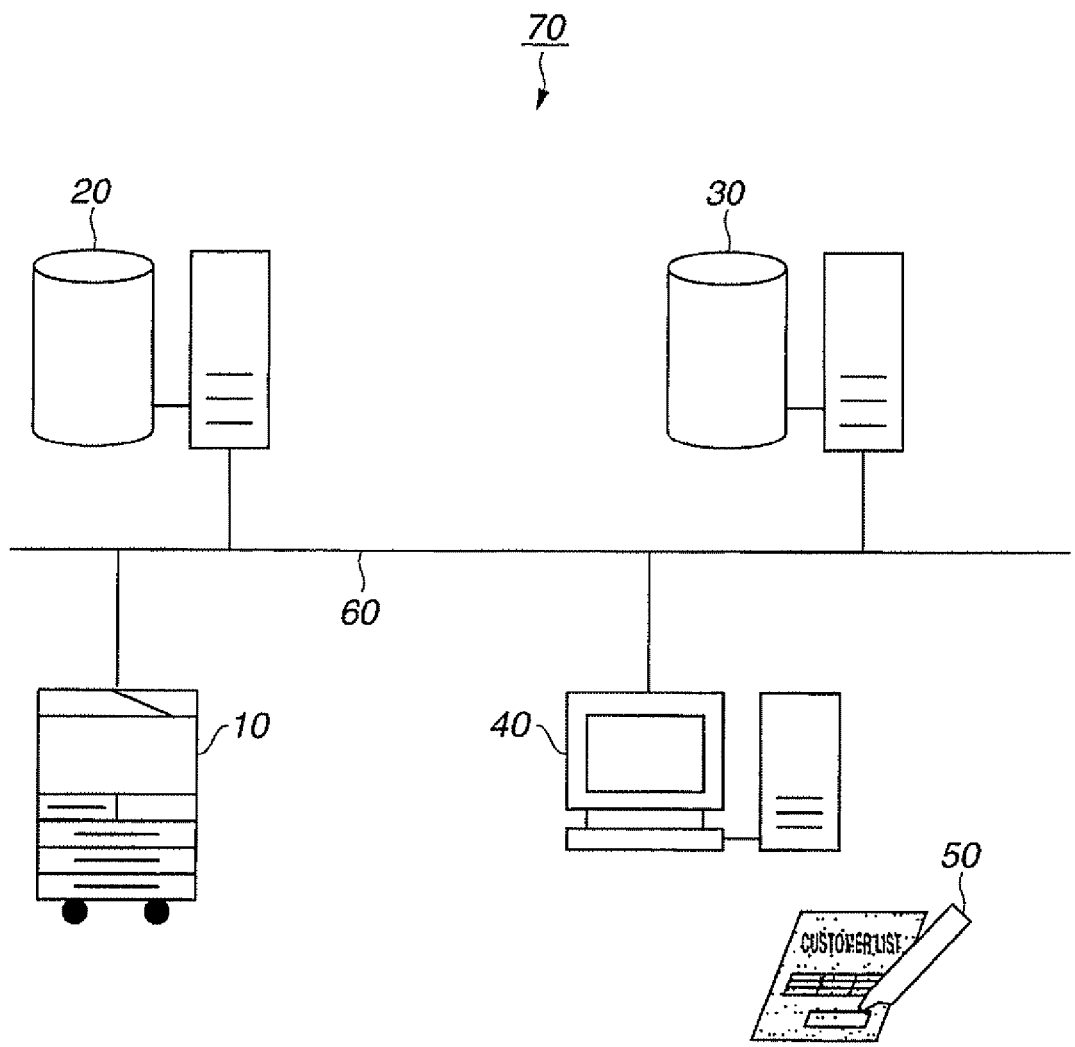
FIG. 1 is a diagram showing a configuration of a handwritten information management system 70.

FIG. 1 is a diagram showing a configuration of the handwritten information management system 70.

As shown in FIG. 1, the handwritten information management system 70 includes an image formation device 10, a document management server 20, an identification information management server 30, and a client PC 40, each of which is connected through a communication line 60. Additionally, the client PC 40 can receive information read by an electronic pen 50 capable of reading coded patterns from a paper sheet outputted by the image formation device 10. The coded patterns are superimposedly printed on the paper sheet with the image data of the electronic document, and are formed with fine dots.

The image formation device 10 is a printing device provided with a scanner function, and can superimposedly print out and output on a paper sheet the specified image data of the electronic document and the coded patterns in which various kinds of information are recorded.

The document management server 20 is provided with a storage device, and stores electronic documents and handwritten information such as characters and drawings written on the paper sheet on which the coded patterns are printed by hand using the electronic pen 50.

The identification information management server 30 is provided with a storage device, and stores a paper sheet ID, which is identification information on the paper sheet outputted by the image formation device 10, a document ID, which is identification information on the electronic document, a handwriting ID, which is identification information on handwritten information written on a paper sheet on which the coded patterns are printed, and so on. Additionally, the identification information management server 30 stores the mutual relationship among the document ID, the paper sheet ID and the handwriting ID so as to be able to identify which electronic document is printed on which paper sheet, and which handwritten information is written to the paper sheet.

The client PC 40 is configured with a personal computer. The client PC 40 orders the image formation device 10 to print out the electronic document stored in the document management server 20; receives information stored in the electronic pen 50 through the electronic pen 50, Bluetooth or other wireless communication; and detects the handwritten information written with the electronic pen 50. Additionally, electronic documents generated with the client PC 40 are stored in the document management server 20.

In the handwritten information management system 70 as configured above, each of the electronic documents is stored by uniquely providing the document ID, which is the identification information. Additionally, each of the paper sheets outputted by the image formation device 10 is managed also by uniquely providing the paper sheet ID, which is the identification information. Furthermore, each of the handwritten information written on the paper sheet outputted by the image formation device 10 with the electronic pen 50 is managed also by uniquely providing the handwriting ID, which is the identification information.

As described above, in the handwritten information management system 70, the document ID, the paper sheet ID and the handwriting ID are attached to the electronic document, the paper sheet and the handwritten information, respectively, and various managements are implemented.

Next, a configuration of the image formation device 10, the document management server 20, the identification information management server 30 and the client PC 40 will be described with reference to FIGS. 2A through 2D.

Figure 2A:
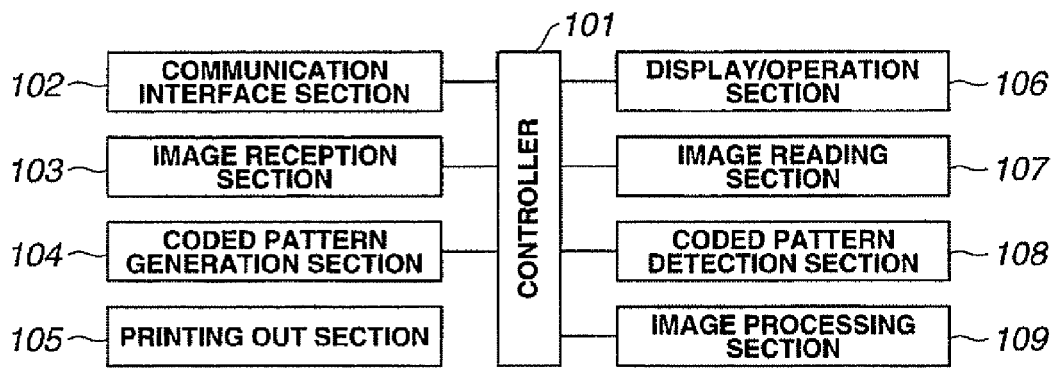
FIGS. 2A through 2D are block diagrams showing configurations of an image formation device 10, a document management server 20, an identification information management server 30, a client PC 40.
Figure 2B:
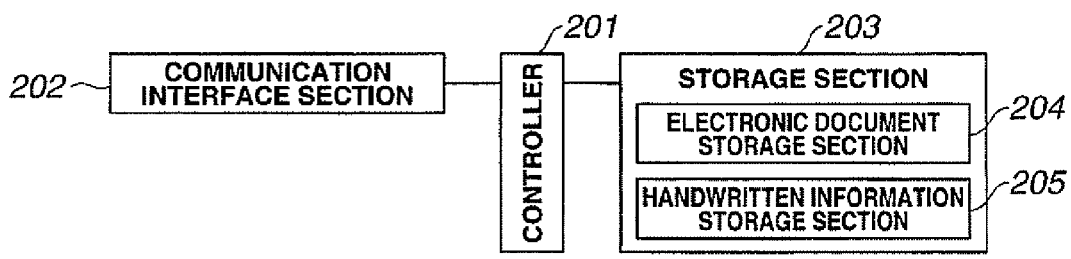
Figure 2C:
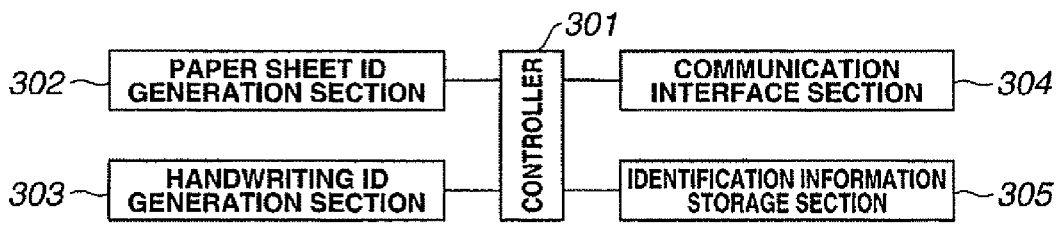
Figure 2D:
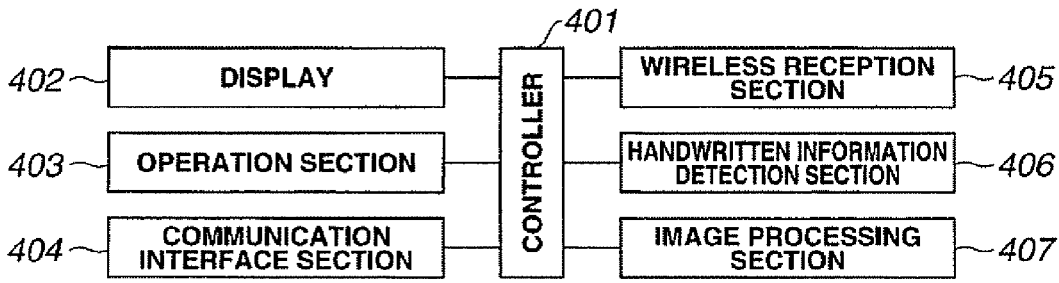

FIG. 2A is a block diagram showing a configuration of the image formation device 10; FIG. 2B is a block diagram showing a configuration of the document management server 20; FIG. 2C is a block diagram showing a configuration of the identification information management server 30; and FIG. 2D is a block diagram showing a configuration of the client PC 40.

As shown in FIG. 2A, the image formation device 10 includes a controller 101, a communication interface section 102, an image reception section 103, a coded pattern generation section 104, a printing out section 105, a display/operation section 106, an image reading section 107, a coded pattern detection section 108, and an image processing section 109.

The controller 101 performs overall control of the image formation device 10.

The communication interface section 102 is connected with the communication line 60, and sends/receives information with the document management server 20, the identification information management server 30 and the client PC 40.

The image reception section 103 receives the electronic document sent through the communication line 60 from the document management server 20.

The coded pattern generation section 104 generates the coded patterns that are superimposedly printed on the paper sheet. Positional information on the paper sheet to be printed, the paper sheet ID and so on are recorded in the coded patterns.

The printing out section 105 superimposedly prints on the paper sheet an image data of the electronic document received by the image reception section 103 and the coded patterns generated by the coded pattern generation section 104.

The display/operation section 106 is configured with a liquid crystal touch screen; provides user with information; and receives from the user orders related to operations.

The image reading section 107 is configured with a scanner, reads original documents provided, and converts to image data. By emitting infrared rays to the original documents and reading the documents, the image reading section 107 can read the coded patterns printed on the document with a material that absorbs the infrared rays.

The coded pattern detection section 108 detects the coded patterns printed on the paper sheet from the image data read by the image reading section 107, and detects the paper sheet ID recorded with the detected coded patterns or other information.

The image processing section 109 performs image processing of superimposing image data of one or more pieces of handwritten information and the electronic document, putting colors on the outputted handwritten information, and attaching a comment, and the like.

Additionally, as shown in FIG. 2B, the document management server 20 includes a controller 201, a communication interface section 202 and a storage section 203. The storage section 203 is provided with an electronic document storage section 204 and a handwritten information storage section 205.

The controller 201 performs overall control of a document management server 20.

The communication interface section 202 is connected to the communication line 60, and sends/receives information with the image formation device 10, the identification information management server 30 and the client PC 40.

The storage section 203 is configured with a storage device. The electronic documents managed by the handwritten information management system 70 are stored in an electronic document storage section 204 provided in the storage section 203. The handwritten information written with the electronic pen 50 is stored in a handwritten information storage section 205 provided in the storage section 203.

Additionally, as shown in FIG. 2C, the identification information management server 30 includes a controller 301, a paper sheet ID generation section 302, a handwriting ID generation section 303, a communication interface section 304 and an identification information storage section 305.

The controller 301 performs overall control of the identification information management server 30.

The paper sheet ID generation section 302 generates the paper sheet ID attached to the paper sheet outputted by the image formation device 10. The generated paper sheet ID is identification information that is uniquely provided to the paper sheets outputted by the image formation device 10.

The handwriting ID generation section 303 generates the handwriting ID. The handwriting ID is identification information that is uniquely provided to the handwritten information written with the electronic pen 50.

The communication interface section 304 is connected to the communication line 50, and sends/receives information with the image formation device 10, the document management server 20 and the client PC 40.

The identification information storage section 305 stores various kinds of information, including identification information of the paper sheet ID, the document ID and the handwriting ID.

As shown in FIG. 2D, the client PC 40 includes a controller 401, a display 402, an operation section 403, a communication interface section 404, a wireless reception section 405, a handwritten information detection section 406 and an image processing section 407.

The controller 401 performs overall control of the client PC 40.

The display 402 is configured with a display, and provides an operator with information.

The operation section 403 is configured with a keyboard, and receives orders from the operator.

The communication interface section 404 is connected to the communication line 60, and sends/receives information with the image formation device 10, the document management server 20 and the identification management server 30.

The wireless reception section 405 receives from the electronic pen 50 information that is read by the electronic pen 50 through wireless communication.

The handwritten information detection section 406 detects handwritten information such as characters and drawings written with the electronic pen 50 based on the information receive by the wireless reception section 405.

The image processing section 407 performs image processing of overlaying image data of at least one piece of handwritten information and the electronic document.

Next, a paper sheet outputted through superimposed printing by the image formation device 10 will be described with reference to FIG. 3.

Figure 3:
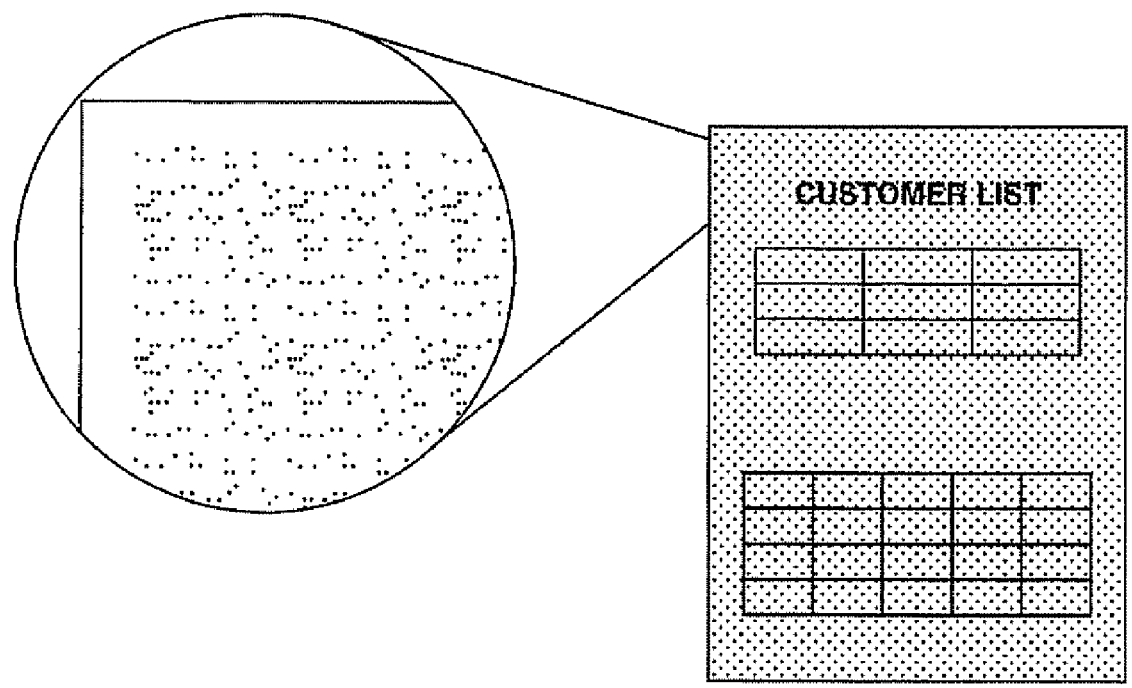
FIG. 3 is a schematic view showing a paper sheet in which an image data of an electronic document and coded patterns are printed in a superimposed manner.

FIG. 3 is a schematic view showing a paper sheet in which image data of an electronic document and the coded patterns are superimposedly printed.

As shown in FIG. 3, in the paper sheet outputted through superimposed printing by the image formation device 10, the image data of the electronic document and the coded patterns are superimposedly printed.

The coded patterns, which are superimposed and printed, are printed on the paper sheet with fine dots. Of the superimposed and printed coded patterns and the image data of the electronic document, the coded patterns are printed with a toner that absorbs infrared rays, while the image data of the electronic document is printed with a toner that does not absorb infrared rays. The superimposed printing as described above is performed by the printing out section 105 in the image formation device 10. Therefore, after the printed paper sheet is placed to the image reading section 107 and the infrared rays are emitted to the sheet, the reflected light is absorbed only in a portion where the coded patterns are printed, whereby the coded patterns are detected by the coded patterns detection section 108.

It should be noted that it may be possible to perform the superimposed printing of the coded patterns with an invisible toner in place of the toner that absorbs the infrared rays. If the superimposed printing is performed with the invisible toner, an effect that the coded patterns are not visible on the superimposed printed paper sheet while only the image data of the electronic document is visible can be obtained.

Next, the coded patterns superimposedly printed on the paper sheet by the image formation device 10 will be described with reference to FIGS. 4A through 4C.

Figure 4A:
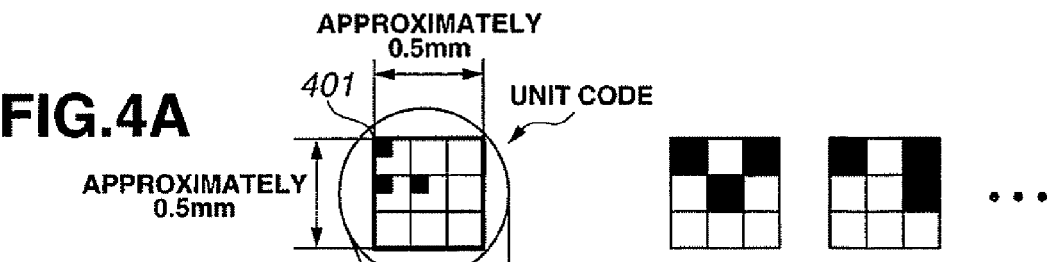
FIGS. 4A through 4C are schematic views showing coded patterns.
Figure 4B:
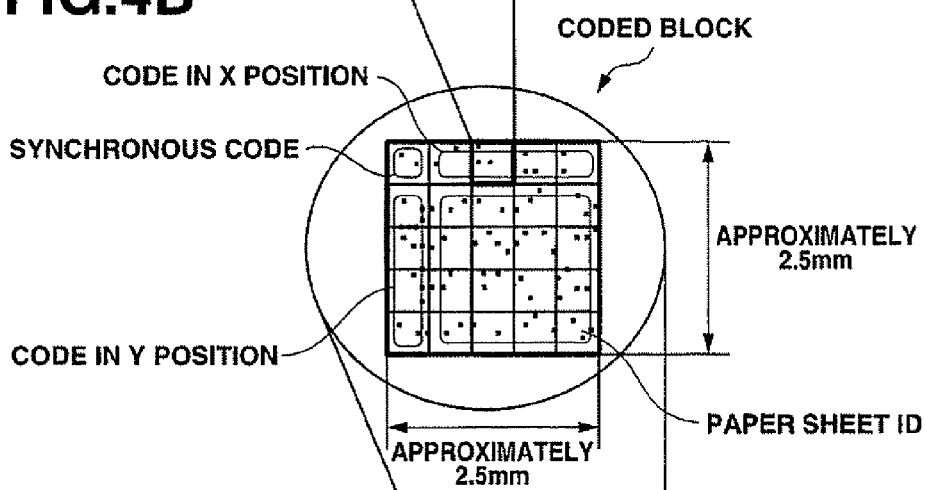
Figure 4C:
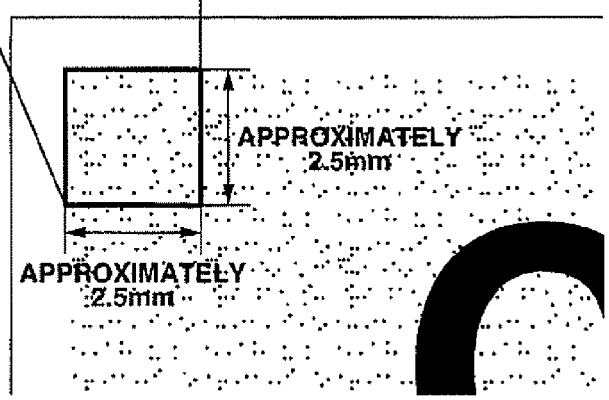

FIGS. 4A through 4C are schematic views showing coded patterns.

FIG. 4A is a schematic view showing a unit code, which is a minimum coded unit of the coded patterns. FIG. 4B is a schematic view showing a coded block, which is configured with 25 unit codes. FIG. 4C is a schematic view showing coded patterns, which are configured with the coded blocks on a paper sheet.

As shown in FIG. 4A, three dots 410 are arranged in a square of 0.5076 mm×0.5076 mm. The square is divided into nine sections with three cells in length and three cells in width. Of the nine cells, three cells are selected and dots are arranged in the three cells. Since nine cells are available in the square for arranging the dots and three cells are selected from the nine cells, there are 84 possible combinations (9C3) available for the unit codes to be formed.

Additionally, as shown in FIG. 4B, one coded block is formed in a state where 25 unit codes are arranged in a square form with five cells in length and five cells in width.

In the one coded block, there are 25 unit codes, which includes one unit code in which synchronous information for synchronization is recorded, four unit codes in which a location on an X-axis on the paper sheet is recorded, four unit codes in which a location on a Y-axis on the paper sheet is recorded, 16 unit codes in which a paper sheet ID provided to each paper sheet on which the coded patterns are printed is recorded.

Additionally, by superimposedly printing the coded blocks as described above on the paper sheet, the location on the paper sheet can be identified based on the two axes, X-axis and Y-axis, and the paper sheet ID is recorded on the paper sheet.

Additionally, as shown in FIG. 4C, the coded blocks are superimposedly printed on the paper sheet with the image data of the electronic document.

Next, the electronic pen 50 will be described with reference to FIGS. 5A and 5B.

Figure 5A:
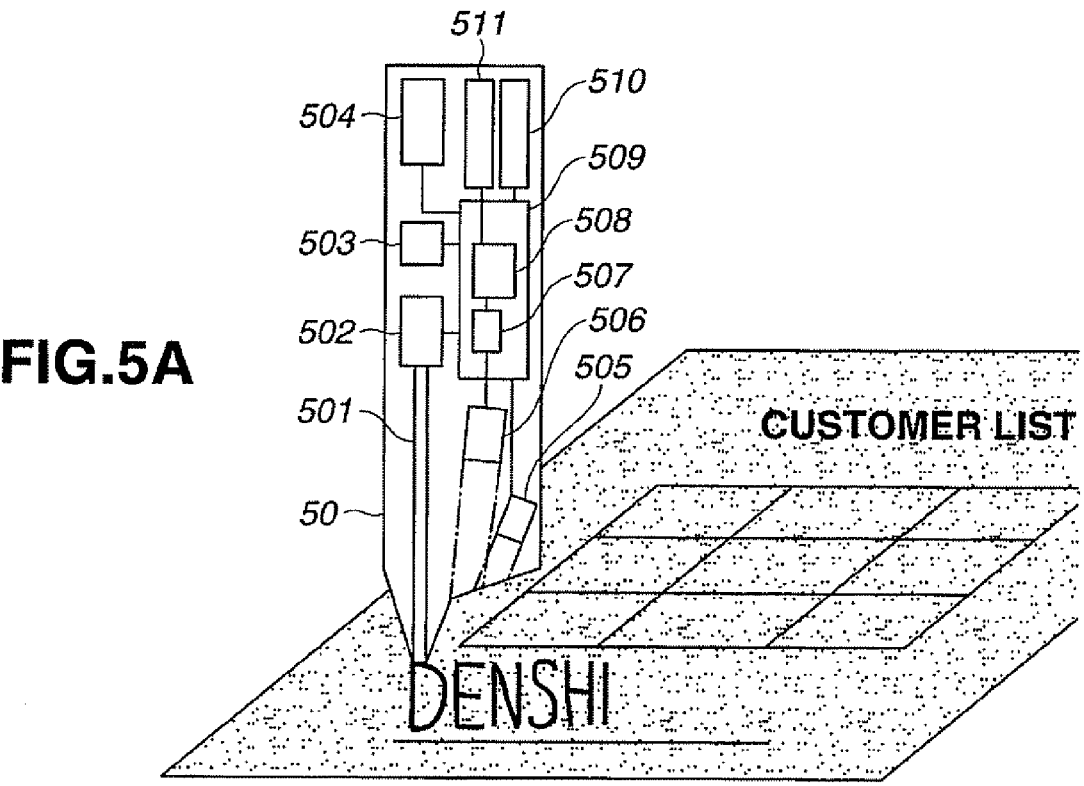
FIGS. 5A and 5B are diagrams showing configurations of an electronic pen 50.

FIG. 5A is a schematic diagram showing a configuration of the electronic pen 50. FIG. 5B is a schematic diagram showing a way in which the handwritten information written with the electronic pen 50 is recorded in the document management server 20.

The electronic pen 50 is capable of writing on the paper sheet on which the coded patterns are superimposedly printed and that is outputted by the image formation device 10, and of obtaining the handwritten information, such as characters and drawings, as written above.

As shown in FIG. 5A, the electronic pen 50 includes a pen tip 501, a pressure sensor 502, a pen ID memory 503, a communication circuit 504, an infrared LED (Light Emitting Diode) 505, an infrared CMOS (Complementary Metal Oxide Semiconductor) 506, an image processing section 507, a data processing section 508, a control circuit 509, a battery 510 and a memory 511.

The pen tip 501 is a pen shaft that contains ink for writing on paper sheets and so on.

The pressure sensor 502 has a function of detecting pressure applied to the pen tip 501. With the pressure sensor 502, initiation of the handwriting operation with the electronic pen 50 is detected.

The pen ID memory 503 stores a pen ID that is set for each of the electronic pen 50. The pen ID is stored in sets with the user ID in the identification information management server 30. Thus, a user who writes the handwritten information written using the electronic pen 50 can be identified.

The communication circuit 504 is configured with Bluetooth communication device, and sends information stored in the electronic pen 50 to the client PC 40.

The infrared LED 505 has a function of emitting an infrared radiation on the paper sheet.

The infrared CMOS sensor 506 picks up images on the paper sheet to which the infrared LED 505 emits. The infrared CMOS sensor 506 is formed with a global shutter type CMOS that can simultaneously sends the picked up images. In the infrared CMSO sensor 506, a CMOS sensor having a sensitivity of the infrared range is used, and images are picked up at approximately ranging from 70 fps (frame per second) to 100 fps. The infrared LED 505 emits pulsed light in synchronization with the shutter of the infrared CMOS sensor 506 in order to reduce power consumption.

The image processing section 507 applies blurring processing or sharpening processing, such as unsharp masking, to the images picked up by the infrared CMOS sensor 506 to reduce noises; separates coded patterns and image data of electronic document through binarization processing; and detects the coded patterns.

The data processing section 508 decodes the coded patterns detected by the image processing section 507, detects the synchronous information, and further detects the paper sheet ID and coordinate information.

The control circuit 509 detects from images picked up by the infrared CMOS sensor 506 the paper sheet ID and the coordinate information through the image processing section 507 and the data processing section 508, and stores the detect information to the memory 511. Based on plural pieces of coordinate information stored in the memory 511, a trace of the electronic pen is recognized by the handwritten information detection section 406 in the client PC 40, and the handwritten information written with the electronic pen 50 is detected.

The battery 510 supplies electric power used in the electronic pen 50.

The memory 511 stores the paper sheet ID or the plural pieces of coordinate information sent from the control circuit 509, the pen ID or other information.

With the electronic pen 50 as configured above, once writing is started, the pressure sensor 502 detects the start of the writing, emitting light by the infrared LED 505 and picking up images by the infrared CMOS sensor 506 are started, and detecting the coded patterns is started, accordingly.

For the information on the coded patterns detected by the data processing section 508, information on the trace of the electronic pen 50 as a result of handwriting is stored as the plural pieces of information in the memory 511, and information on the paper sheet ID stored in the coded patterns and the pen ID is stored in the memory 511. The information stored in the memory 511 is sent through the communication circuit 504 to the client PC 40. Then, the handwritten information, such as characters and drawings, written on the paper sheet with the electronic pen 50 is detected by the handwritten information detection section 406 in the client PC 40.

Next, with reference to FIG. 5B, a process of storing the handwritten information written with the electronic pen 50 to the document management server 20 will be described.

Figure 5B:
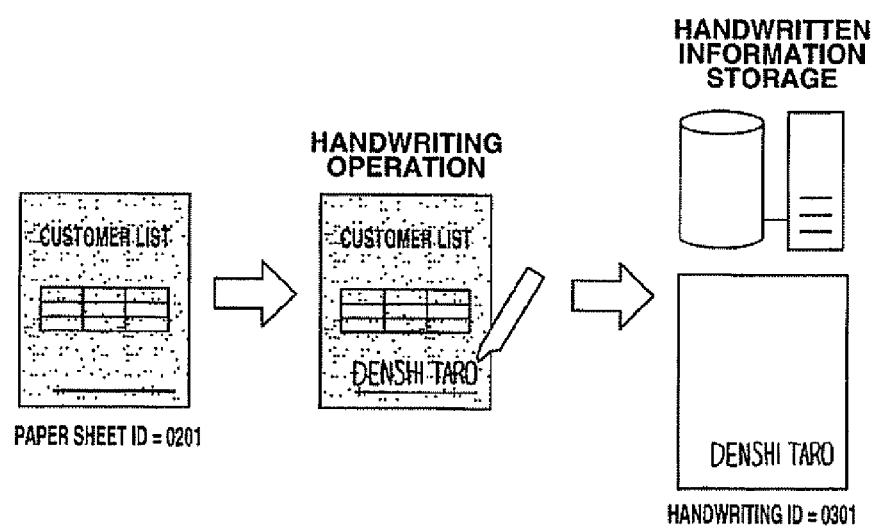

As shown in FIG. 5B, once the handwriting operation with the electronic pen 50 is started on the paper sheet in which the coded patterns are superimposedly printed, the information (paper sheet ID, coordinate information, pen ID and so on) stored in the electronic pen 50 is sent to the client PC 40; the handwritten information detection section 406 in the client PC 40 detects the handwritten information written on the paper sheet. For the handwritten information, as shown in reference numeral 512, characters or figures written with the electronic pen 50 are detected as image data, such as bitmap data.

For the handwritten information detected by the handwritten information detection section 406, the handwriting ID generated and provided by the identification information management server 30 is stored in the identification information management server 30 in correlation with the paper sheet ID of the paper sheet on which handwriting is performed and the user ID of the user who performs the handwriting. Additionally, the handwritten information detected by the handwritten information detection section 406 is stored in the handwritten information storage section 205 in the document management server 20.

Next, information stored in the document management server 20 will be described with reference to FIG. 6.

Figure 6:
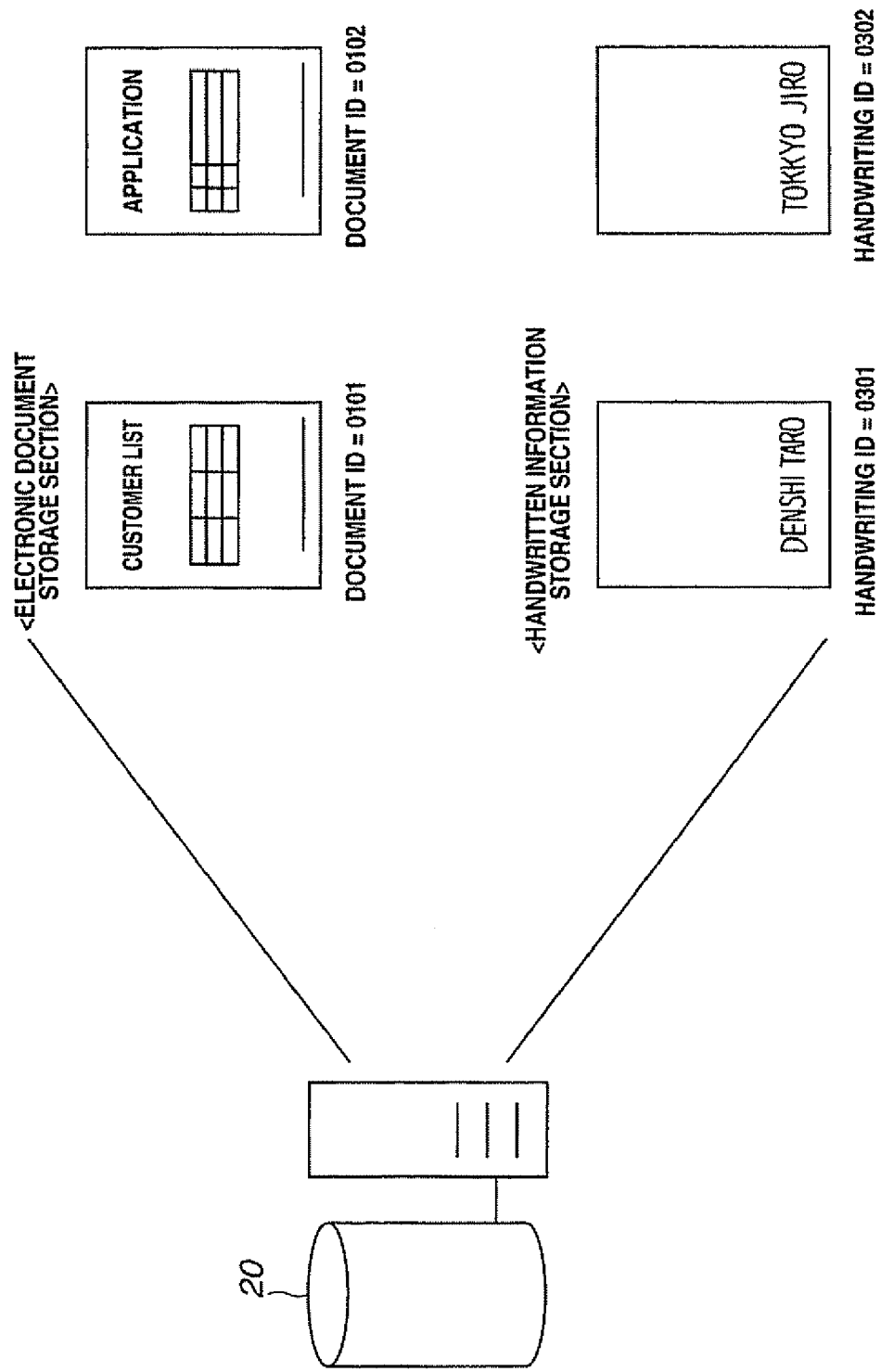
FIG. 6 is a schematic view showing information stored in a document management server 20.

FIG. 6 is a schematic view showing information stored in the document management server 20.

As shown in FIG. 6, electronic documents to which identification information is uniquely provided are stored in the electronic document storage section 204 in the document management server 20.

Additionally, as shown in FIG. 6, in the handwritten information storage section 205 in the document management server 20, handwritten information to which identification information is uniquely provided and which is detected by the handwritten information detection section 406 in the client PC is stored.

Next, information stored in the identification information management server 30 will be described with reference to FIG. 7.

FIG. 7 is a table showing information stored in the identification information storage section 305 in the identification information management server 30.

The identification information storage section 305 stores the paper sheet ID of a paper sheet outputted by the image formation device 10; date and time when the paper sheet is outputted; the document ID of an electronic document indicating image data of the electronic document that is printed on the outputted paper sheet; handwritten information written on the paper sheet; date and time when the handwriting is performed; and a user who performs the handwriting.

As described above, the paper sheet outputted by the image formation device 10, the electronic document that is printed on the outputted paper sheet, and the handwritten information written on the paper sheet are registered.

In the identification information storage section 305, a relationship between the user ID indicating identification information of the user and the pen ID of the electronic pen 50 used by the user is stored. If the pen ID is identified, the user ID of the user who uses the electronic pen is identified. As a result, if the pen ID is sent from the client PC 40, the user who uses the electronic pen 50 can be identified.

Next, in the handwritten information management system 70, a process in which the client PC 40 issues an order to print and the image formation device 10 prints out will be described with reference to FIG. 8.

Figure 8:
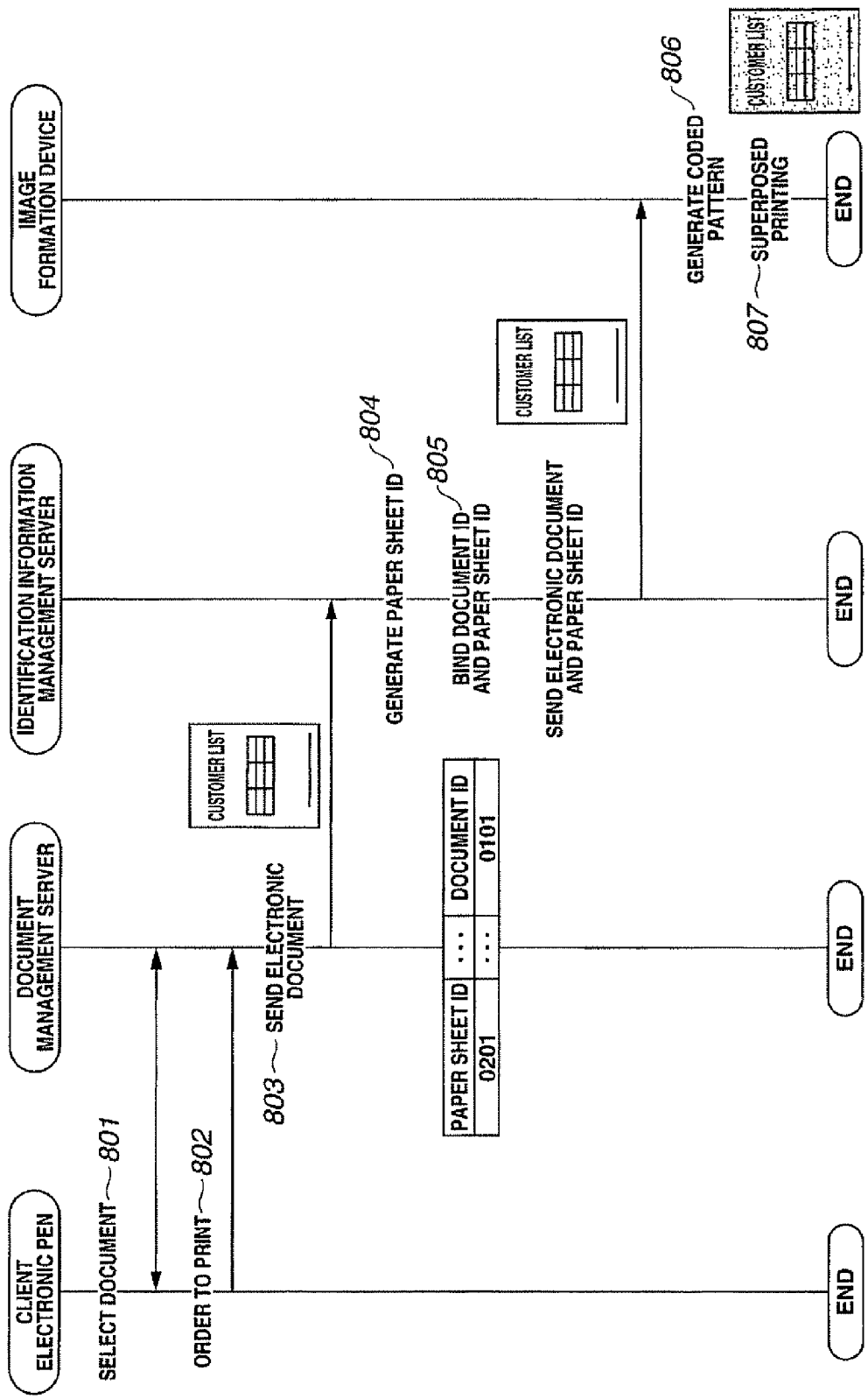
FIG. 8 is a sequence diagram showing processes from printing order to printing out performed in the image formation device 10.

FIG. 8 is a sequence diagram showing a process, in the handwritten information management system 70, in which the client PC 40 issues an order to print and the image formation device 10 prints out.

As shown in FIG. 8, the client PC 40 is operated; an electronic document to be printed is selected from electronic documents stored in the document management server 20 (reference number 801); and the order to print is implemented (reference number 802).

When the printing order is issued by the client PC 40, the order to print the selected electronic document is sent to the document management server 20, and the electronic document, which is a target of the printing order, is sent from the document management server 20 to the identification information management server 30 (reference number 803).

Upon receiving the electronic document, the identification information management server 30, to which the electronic document is sent, newly generates a paper sheet ID provided to a paper sheet to be printed by the paper sheet ID generation section 302 (reference number 804), and a document ID of the electronic document and the generated paper sheet ID are stored in sets in the identification information storage section 305 (reference number 805).

Additionally, the identification information management server 30 sends through the communication interface section 202 the electronic document received from the document management server 20 and the paper sheet ID generated in reference numeral 804 to the image formation device 10.

The image formation device 10, which receives the electronic document and the paper sheet ID, stores the received electronic document in the image reception section 103, and then the received paper sheet ID is sent to the coded pattern generation section 104. Upon receiving the paper sheet ID, the coded pattern generation section 104 generates coded patterns recording the paper sheet ID (reference numeral 806).

After the coded patterns are generated, the coded patterns and the electronic document previously stored in the image reception section 103 are superimposedly printed by the printing out section 105.

In the paper sheet outputted with superimposed printing by the printing out section 105, the paper sheet ID that is generated by the identification information management server 30 and is stored in sets with the document ID is recorded in the coded patterns and is printed out. Furthermore, the image data of the electronic document having the document ID stored in sets with the paper sheet ID is printed.

Next, a process in which handwritten information written with the electronic pen 50 on a paper sheet outputted by the image formation device 10 is stored will be described with reference to FIG. 9.

Figure 9:
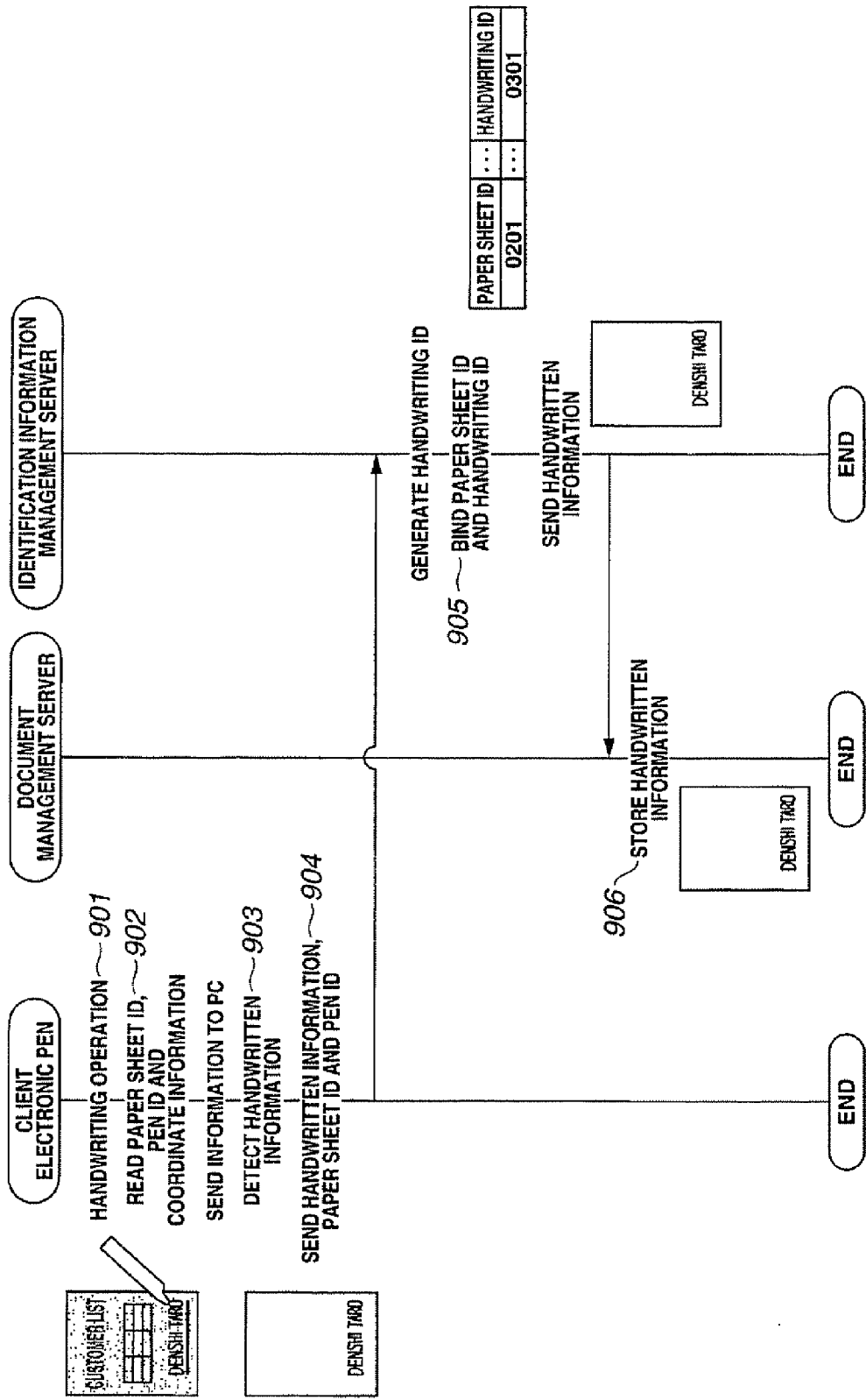
FIG. 9 is a sequence diagram showing a process in which handwritten information written with the electronic pen 50 is stored.

FIG. 9 is a sequence diagram showing a process, in the handwritten information management system 70, in which handwritten information written with the electronic pen 50 on a paper sheet outputted by the image formation device 10 is stored.

As shown in FIG. 9, when handwriting operation with the electronic pen 50 is performed on a paper sheet outputted by the image formation device 10 through superimposed printing with coded patterns (reference numeral 901), upon handwriting operation, a paper sheet ID, a pen ID and coordinate information are recorded in the memory 511 in the electronic pen 50 (reference numeral 902), and those pieces of information are sent to the client PC 40.

Then, the handwritten information detection section 406 in the client PC 40 detects handwritten information, such as characters and drawings, written on the paper sheet with the electronic pen 50 (reference numeral 903).

After the handwritten information is detected, the client PC 40 sends the handwritten information as detected above, the paper sheet ID and the pen ID received from the electronic pen 50 to the identification information management server 30 (reference numeral 904).

Upon receiving the handwritten information, the paper sheet ID and the pen ID from the client PC 40, the identification information management server 30 generates a handwriting ID, which is identification information provided by the handwriting ID generation section 303 to the handwritten information.

Then, the generated handwriting ID is stored in sets with the received paper sheet ID to the identification information storage section 305 (reference numeral 905). Accordingly, the relationship in connection with what kind of handwriting is performed on which paper sheet is stored.

Then, the identification information management server 30 sends the handwritten information received from the client PC 40 and the handwriting ID provided to the handwritten information to the document management server 20.

The document management server 20 stores the received handwritten information, together with the handwriting ID (reference numeral 906).

Next, a process in which the electronic document stored in the document management server 20 and the handwritten information are outputted by the image formation device 10 will be described with reference to FIG. 10.

Figure 10:
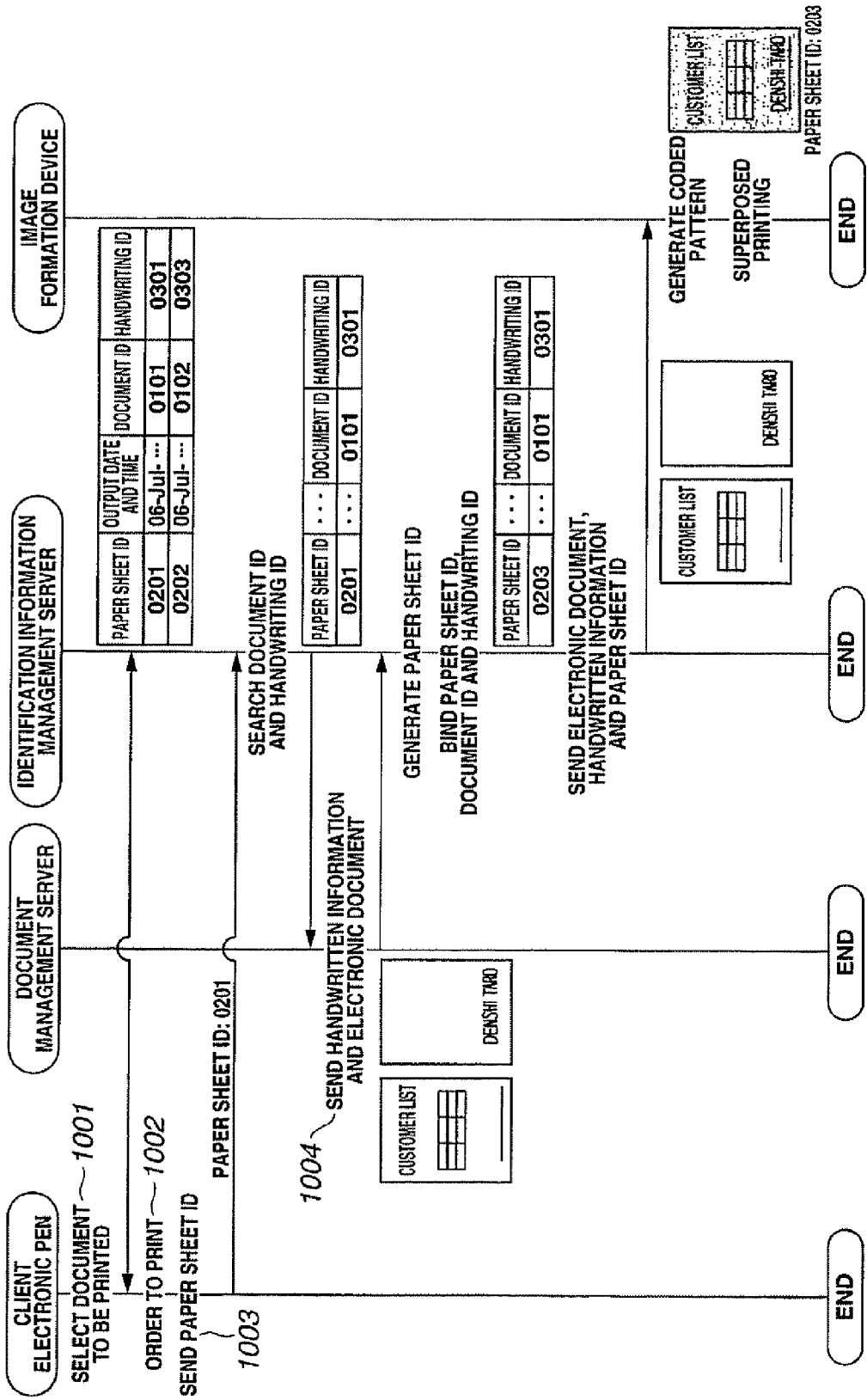
FIG. 10 is a sequence diagram showing a process in which an electronic document and handwritten information stored in the document management server 20 is outputted by the image formation device 10.

FIG. 10 is a sequence diagram showing a process in which the electronic document stored in the document management server 20 and the handwritten information are outputted by the image formation device 10.

As shown in FIG. 10, a document to be printed is selected through operation of the client PC 40. The selection of the document to be printed is made such that the client PC 40 accesses the identification information management server 30; the identification information stored in the identification information storage section 305 in the identification information management server 30 is displayed on the display 402 in the client PC 40; and the operation section 403 is operated. Although detailed description will be made later with reference to FIG. 12, the selection of the document to be printed is made not only by selecting a paper sheet ID from identification information managed by the identification information storage section 305 and ordering to print, but also may be made by selecting the document ID and the handwriting ID in lieu of the desired electronic document and the desired handwritten information, respectively, and ordering to print. In the description with reference to FIG. 10 here, it is assumed that the paper sheet ID is selected and the printing order is made.

The operation section 403 in the client PC 40 is operated to select the desired paper sheet ID (reference number 1001), and printing order is made (reference numeral 1002).

After the printing order is made, the client PC 40 sends to the identification information management server 30 the paper sheet ID of the paper sheet in which printing is desired (reference numeral 1003). It should be noted that, in a case where the selection of the document in which the printing is desired is not made by selecting the paper sheet ID but made by selecting the document ID and the handwriting ID, which will be described later with reference to FIG. 12, information sent to the identification information management server 30, together with the printing order, is not the paper sheet ID, but the document ID and the handwriting ID.

After the identification information management server 30 receives printing order, the received paper sheet ID is searched from the identification information storage section 305, and a document ID and a handwriting ID respectively corresponding to an electronic document and handwritten information configuring a paper sheet of the paper sheet ID are searched. After the document ID and the handwriting ID are searched, those pieces of information are sent to the document management server 20.

The document management server searches an electronic document corresponding to the received document ID and handwritten information corresponding to the handwritten ID from the electronic document storage section 204 and the handwritten information storage section 205, respectively. Then, the searched electronic document and the handwritten information are sent to the identification information management server 30 (reference numeral 1004).

The identification information management server 30 generates new paper sheet ID in the paper sheet ID generation section 302.

Then, the newly generated paper sheet ID is stored in the identification information storage section 305, together with the handwriting ID of the handwritten information and the document ID of the electronic document received from the document management server 20 (reference numeral 1005).

After the new paper sheet ID, the document ID and the handwriting ID are stored in the identification information storage section 305 in a set, the identification information management server 30 sends the electronic document and the handwritten information received from the document management server 20 and the new paper sheet ID to the image formation device 10.

Upon receiving the electronic document, handwritten information and the paper sheet ID from the identification information management server 30, the image formation device generates in the coded pattern generation section 104 coded patterns in which the received paper sheet ID is recorded.

Then, the printing out section 105 in the image formation device 10 performs superimposed printing of the generated coded patterns with the image data of the electronic document received by the image formation device 10 from the identification information management server 20 (reference numeral 1006).

As described above, the image processing section 109 performs the image processing of overlaying the image data of the handwritten information stored in the document management server 20 on the image data of the electronic document stored in the document management server 20, and the image formation device 10 performs superimposed printing of the overlaid image data with the coded patterns.

Next, a process in which new handwritten information is written on a paper sheet including handwritten information outputted by the image formation device 10 will be described with reference to FIG. 11.

Figure 11:
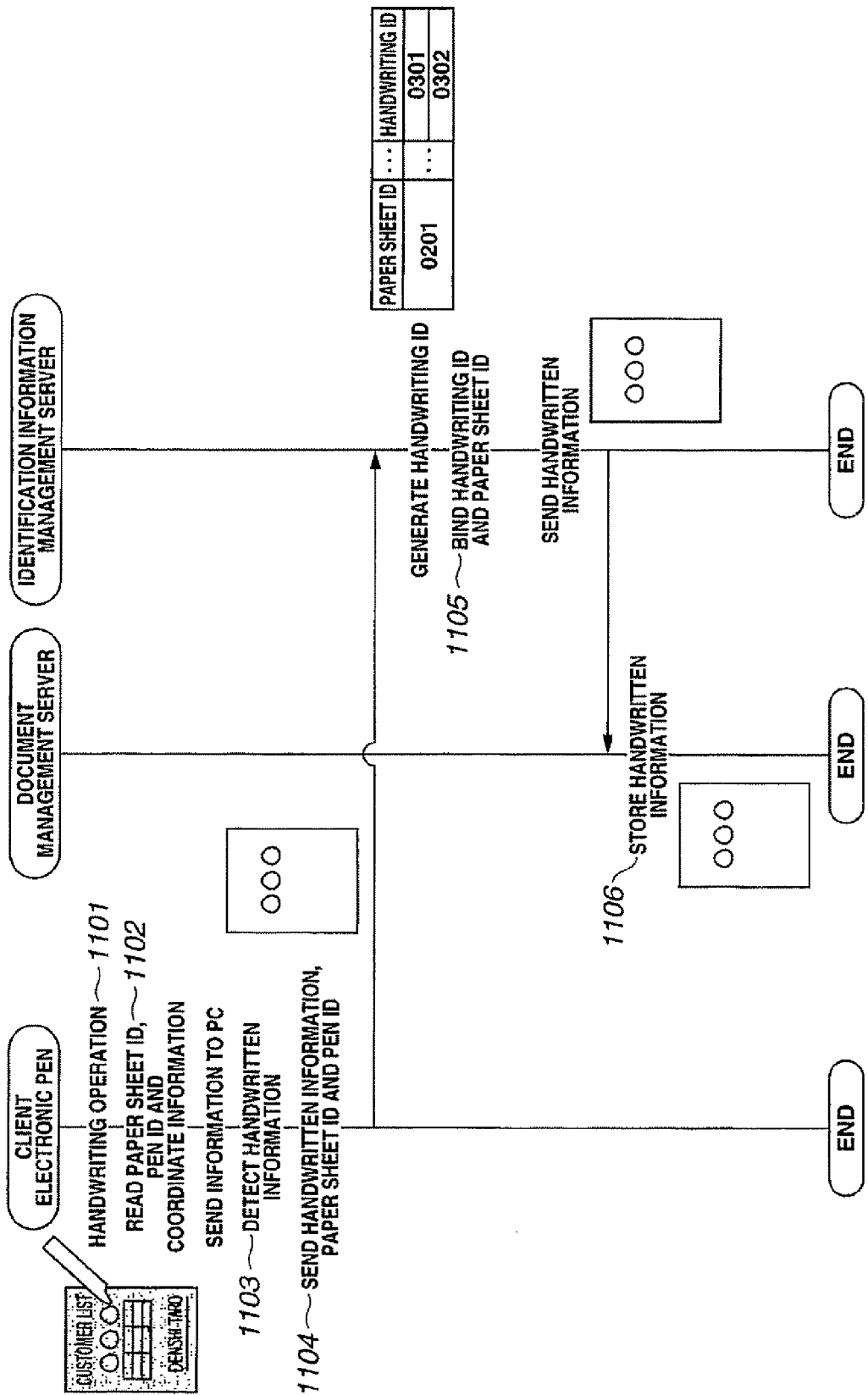
FIG. 11 is a sequence diagram showing a process at the time when new handwritten information is written to a paper sheet including handwritten information.

FIG. 11 is a sequence diagram showing a process in which new handwritten information is written on a paper sheet including handwritten information outputted by the image formation device 10.

On the paper sheet to which new handwritten information is to be written, handwriting operation is already performed with the electronic pen 50. Additionally, a handwriting ID of the already written handwritten information is registered in the identification information management server 30.

Then, once handwriting is performed with the electronic pen 50 on the paper sheet as described above (reference number 1101), a paper sheet ID, a pen ID and coordinate information is recorded in the memory 511 of the electronic pen 50 upon handwriting operation (reference number 1102), and those pieces of information are sent to the client PC 40. Then, the handwritten information detection section 406 in the client PC 40 detects the handwritten information, such as characters and drawings, written on the paper sheet with the electronic pen 50 (reference numeral 1103).

Upon detecting the handwritten information, the client PC 40 sends the detected handwritten information and the paper sheet ID and the pen ID received from the electronic pen 50 to the identification information management server 30 (reference number 1104).

Upon receiving the handwritten information, the paper sheet ID and the pen ID from the client PC 40, the identification information management server 30 generates a handwriting ID, which is identification information provided by the handwriting ID generation section 303 to the received handwritten information.

Then, the generated handwritten ID is combined with the received paper sheet ID, and is stored in the identification information storage section 305 (reference number 1105). In the storage operation, the handwriting ID of the handwritten information that is already written on the paper sheet and the handwritten ID of the newly written handwritten information are combined with the paper sheet ID of the paper sheet, and are stored in the identification information storage section 305.

After the handwritten information is stored, the identification information management server 30 sends the newly written handwritten information and the handwriting ID to the document management server 20.

Then, the document management server 20 stores the sent handwritten information, together with the handwriting ID.

As described above, when a new handwriting operation is performed with the electronic pen 50 on the paper sheet to which the handwritten information is already printed and which is outputted by the image formation device 10, the handwritten information is detected and is stored.

Next, a process in which a document to be printed is selected by the client PC 40 will be described in detail with reference to FIG. 12.

FIG. 12 is a screen configuration diagram showing an output document selection screen displayed on the display 402 of the client PC 40.

In the handwritten information management system 70, a document for which printing is requested is selected with the client PC 40. However, as described with reference to FIG. 10, the selection of the document is performed not only by designating the paper sheet ID stored in the identification information management server 30, but also may be performed by designating the document ID and the handwriting ID stored in the identification information management server 30.

As shown in FIG. 12, an output document selection screen is displayed on the display 402 of the client PC 40.

With the output document selection screen, the client PC 40 sends/receives information with the identification information management server 40. The output document selection screen shows the information on identification information stored in the identification information storage section 305 in the identification information management server.

Additionally, in a lower part of the output document selection screen, there are: a paper ID selection button 1201 for selecting a paper ID from a displayed table of identification information; a document ID selection button 1202 for selecting a document ID from a displayed table of identification information; a handwriting ID selection button 1203 for selecting a handwriting ID from a displayed table of identification information; an arrow button 1204; a set button 1206 for determining the ID in the table selected with the arrow buttons 1204, 1205; and a reset button 1207 for resetting the ID determined with the set button 1206.

To select an output document through the output document selection screen as described above, there are a pattern in which only a paper sheet ID is selected, and a pattern in which a document ID and a handwriting ID are respectively selected without selecting the paper sheet ID.

In the case where only the paper sheet ID is selected, as described with reference to FIG. 10, the selected paper sheet ID is sent from the client PC 40 to the identification information management server 30.

On the other hand, in the case where the electronic document ID and the handwriting ID are respectively selected without selecting the paper sheet ID, one electronic document ID and the one or more handwriting IDs are selected through the output document selection screen, and information on the selected ID is sent from the client PC 40 to the identification information management server 30.

For example, in the output document selection screen as shown in FIG. 12, an electronic document with a document ID represented by "102" is selected (reference number 1207), and handwritten information with a handwriting ID represented by "0302" is selected (reference number 1208).

Next, with reference to FIG. 13, a description will be made of a case where a document ID and a handwriting ID are selected and outputted without selecting a paper sheet ID when a document to be printed is selected through the client PC 40.

Figure 13:
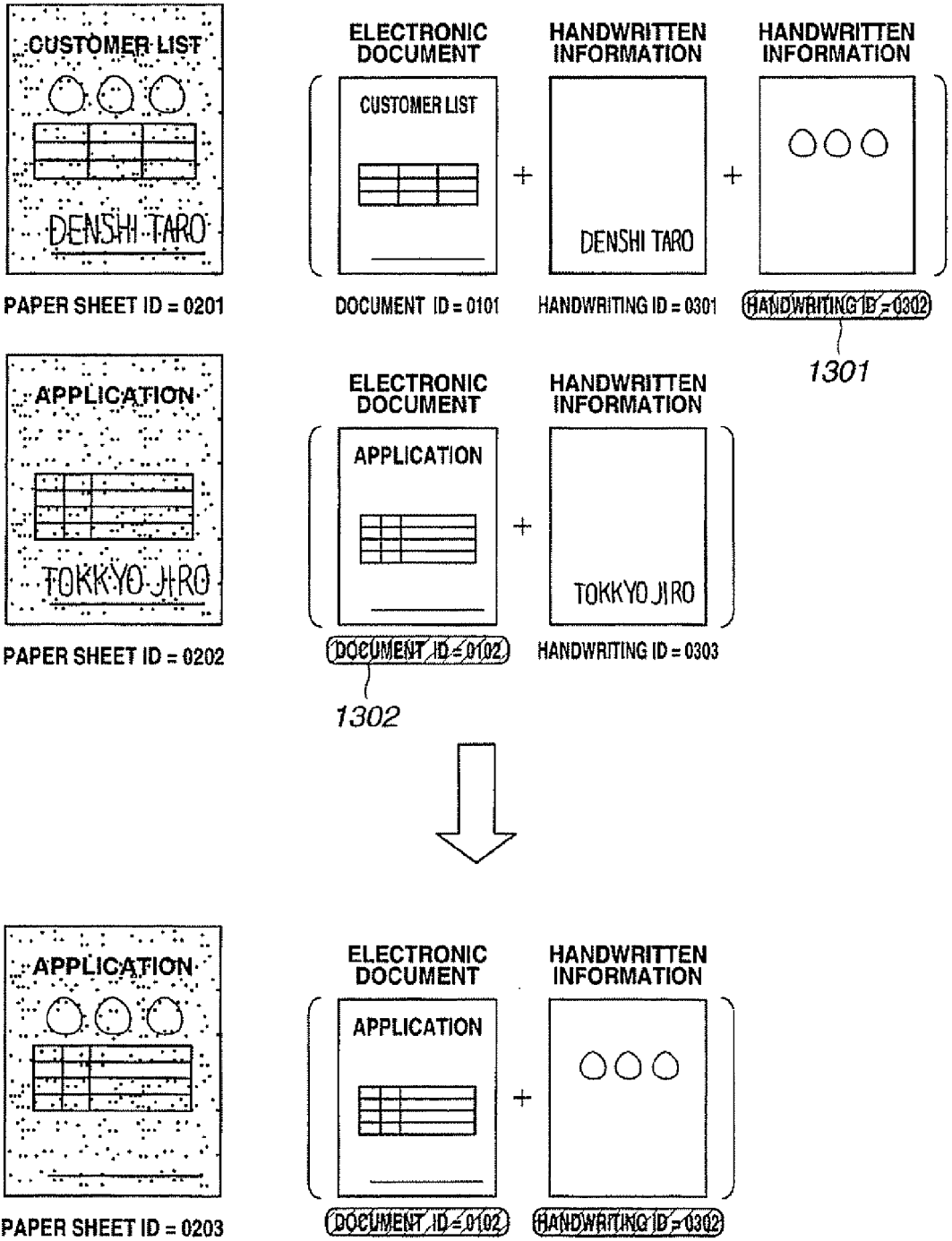
FIG. 13 is a schematic view showing a case where an paper sheet ID and a handwriting ID are selected and outputted by the image formation device 10.

FIG. 13 is a schematic view showing a case where a paper sheet ID and a handwriting ID are selected and outputted by the image formation device 10.

For example, as shown in FIG. 13, a paper sheet with paper sheet ID of "0201" is formed by writing handwritten information with handwriting IDs of "0301" and "0302" to an electronic document with document ID of "0101." A paper sheet with paper sheet ID of "0202" is formed by writing handwritten information with handwriting ID of "0303" to an electronic document with document ID of "0102." Additionally, the relationship regarding those pieces of information is stored in the identification information storage section 305 in the identification information management server 30.

Under the situation as described above, it may be possible to give an order for the image formation device 10 to output the handwritten information with handwriting ID of "0302", which is written on the paper sheet with paper sheet ID of "0201" (reference number 1301), together with the electronic document with document ID of "0102", which is a source of printing of the paper sheet with paper sheet ID of "0202" (reference number 1302).

As a result of the printing order, the image formation device 10 outputs a paper sheet in which the handwritten information with handwriting ID of "0302" is overlaid on the electronic document with document ID of "0102" and is outputted.

As described above, in the handwritten information management system 70, the paper sheet for which the printing order is given may be selected through combining the electronic document and the handwritten information, which form the paper sheet, in different paper sheets.

In this case, when handwritten information is printed out after combining information in different paper sheets, those pieces of handwritten information and the image data of the electronic document are combined in the image processing section 109 in the image formation device 10, and are superimposedly printed out with the coded patterns.

Next, a paper sheet on which handwritten information is printed will be described with reference to FIGS. 14A through 14E.

Figure 14A:
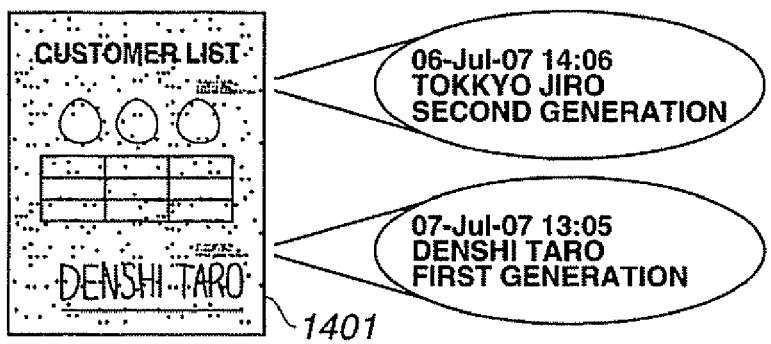
FIGS. 14A through 14E are schematic views showing paper sheets in which written information is printed.
Figure 14B:
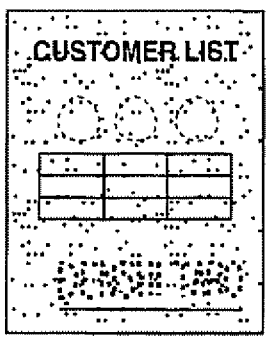
Figure 14C:
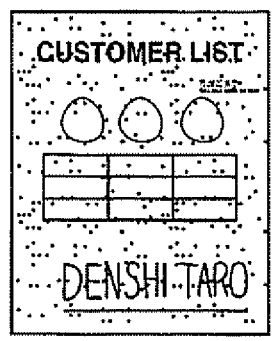
Figure 14D:
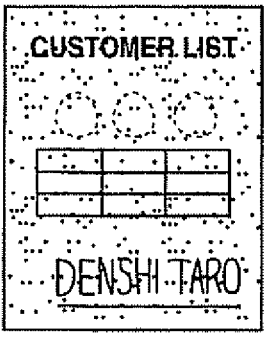
Figure 14E:
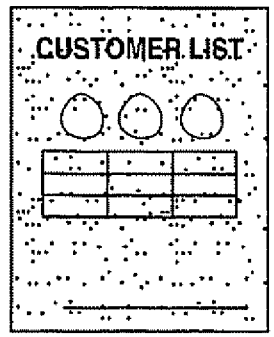

FIGS. 14A through 14E are schematic views showing paper sheets that are outputted by the image formation device 10 and in which plural pieces of handwritten information are printed. FIG. 14A is a schematic view showing a paper sheet in which comment is provided to each of the plural pieces of handwritten information. FIG. 14B is a schematic view showing a paper sheet in which each of the plural pieces of handwritten information is colored with different colors and printed out. FIGS. 14C and 14D are schematic views showing paper sheets that are printed out such that the latest-written handwritten information can be clearly recognized among the plural pieces of handwritten information. FIG. 14E is a schematic view showing a paper sheet in which handwritten information selected based on attribute information of the handwritten information is printed out.

As shown in FIG. 14A, it may be possible to output, by the image formation device 10, a paper sheet such that attribute information of each handwritten information is attached to the handwritten information to be printed. Since the paper sheet is printed out with the comment of the attribute information on the handwritten information as described above, the difference between the image data of the handwritten information printed on the paper sheet and the image data of the electronic document can be clearly understood on the paper sheet.

The attribute information on the handwritten information is information on date when the handwritten information is written, a user name of a user who makes the writing, and a generation at which the writing is made, and so on.

In an example shown in FIG. 14A, as the attribute information, "07-Jul-07 13:05 Denshi Taro first generation" is printed in a right upper portion of the handwritten information printed on the paper sheet in a small size (reference number 1401).

Additionally, as shown in FIG. 14B, it may be possible for the image formation device 10 to output a paper sheet in which each of the plural pieces of handwritten information is printed with different colors such that the attribute information of the handwritten information, such as the order of the writing, the user who makes the writing, date and time when the writing is made, becomes clear.

Additionally, it may be possible to make only the latest handwritten information clear among the handwritten information written on the paper sheet. As shown in FIG. 14C, it may be possible to attach the comment only to the latest handwritten information. Furthermore, as shown in FIG. 14D, it may be possible to perform printing out such that only the latest handwritten information is colored with different color from other handwritten information.

As described above, the process in which the handwritten information is differently colored and the image processing in which the comments are attached to the handwritten information is implemented by the image processing section 109 in the image formation device 10.

Then, the handwritten information to which the image processing is performed and the image data of the electronic document are overlaid, and outputted through the superimposed printing with coded patterns.

Additionally, the handwritten information to be printed on the paper sheet may be selected based on the attribute information of the handwritten information.

In connection with the date, the user name and the generation, which are the attribute information of the handwritten information, it is possible to employ a configuration in which only the handwritten information including the desired attribute information, which is selected by the user, is printed out on the paper sheet.

For example, as shown in FIG. 14E, it may be possible to print out only the handwritten information with the second generation on the paper sheet.

Next, a process in which a paper sheet on which handwritten information is written is copied or scanned by the image formation device 10 will be described with reference to FIG. 15.

Figure 15:
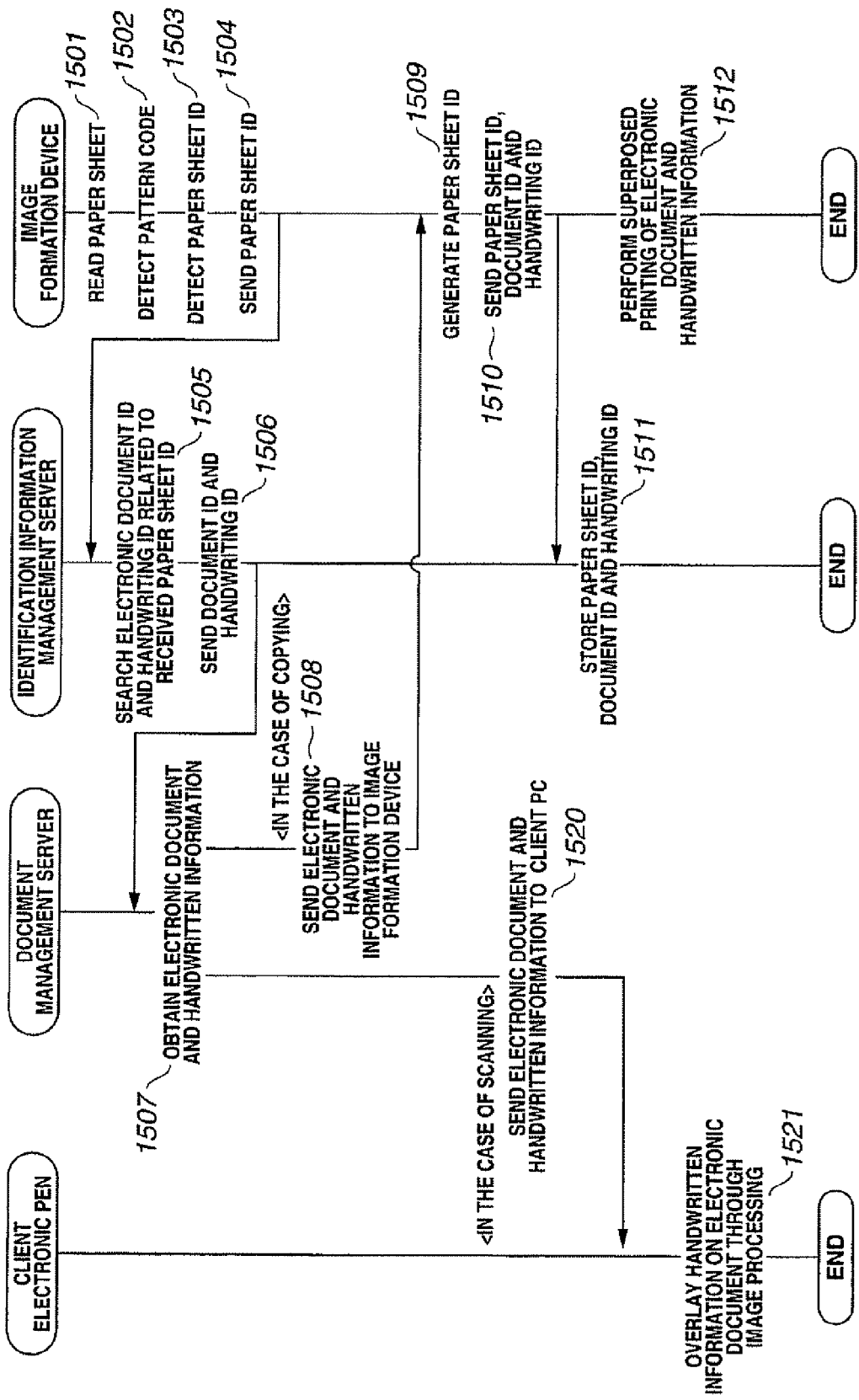
FIG. 15 is a sequence diagram showing a process for copying and scanning.

FIG. 15 is a sequence diagram showing a process in which the image formation device 10 performs processing of copying or scanning.

A user who wishes to copy or scan a paper sheet on which handwritten information is written places the paper sheet on the image reading section 107 of the image formation device 10.

After the image data of the placed paper sheet is read (reference number 1501), the coded pattern detection section 108 detects coded patterns from the image data of the paper sheet (reference numeral 1502), and a paper sheet ID of the paper sheet is detected (reference numeral 1503).

The detected paper sheet ID is sent by the communication interface section 102 to the identification information management server 30 (reference numeral 1504).

Upon receiving the paper sheet ID, the identification information management server 30 searches a document ID of an electronic document and a handwriting ID of the handwritten information configuring the paper sheet of the paper sheet ID from the identification information storage section 305 (reference numeral 1505), and sends the IDs to the document management server 20 (reference numeral 1506).

The document management server 20 receives the document ID and the handwriting ID, and searches an electronic document and handwritten information corresponding to the received identification information from the electronic document storage section 204 and the handwritten information storage section 205 (reference numeral 1507).

When the processing requested by the user is copying, the searched electronic document and the document ID thereof, and the searched handwritten information and the handwriting ID thereof are sent from the document management server 20 to the image formation device 10 (reference numeral 1508).

Upon receiving the electronic document and so on from the document management server 20, the image formation device 10 newly generates a paper sheet ID provided to a paper sheet to be outputted by the printing out section 105 (reference numeral 1509), and sends to the identification information management server 30 the newly generated paper sheet ID, together with the document ID and the handwriting ID received from the document management server 20 (reference numeral 1510).

The paper sheet ID, document ID and handwriting ID sent to the identification information management server 30 are combined and stored in the identification information storage section 305 (reference numeral 1511).

In the image formation device 10, the coded pattern generation section 104 generates coded patterns in which the newly generated paper sheet ID is recorded. Then, the coded patterns and the image data in which the electronic document and the handwritten information, which are received from the document management server 20, are overlaid by the image processing section 109 are outputted with superimposed printing (reference numeral 1512).

Additionally, when the processing requested by the user is scanning, the document management server 20 searches the electronic document and the handwritten information configuring a paper sheet (reference numeral 1507), and the searched electronic document and the handwritten information are sent to the client PC 40.

Upon receiving the electronic document and the handwritten information, the client PC implements an image processing of overlaying those image data in the image processing section 407, and the image data of the paper sheet requested by the user is obtained (reference numeral 1521).

Figure 16:
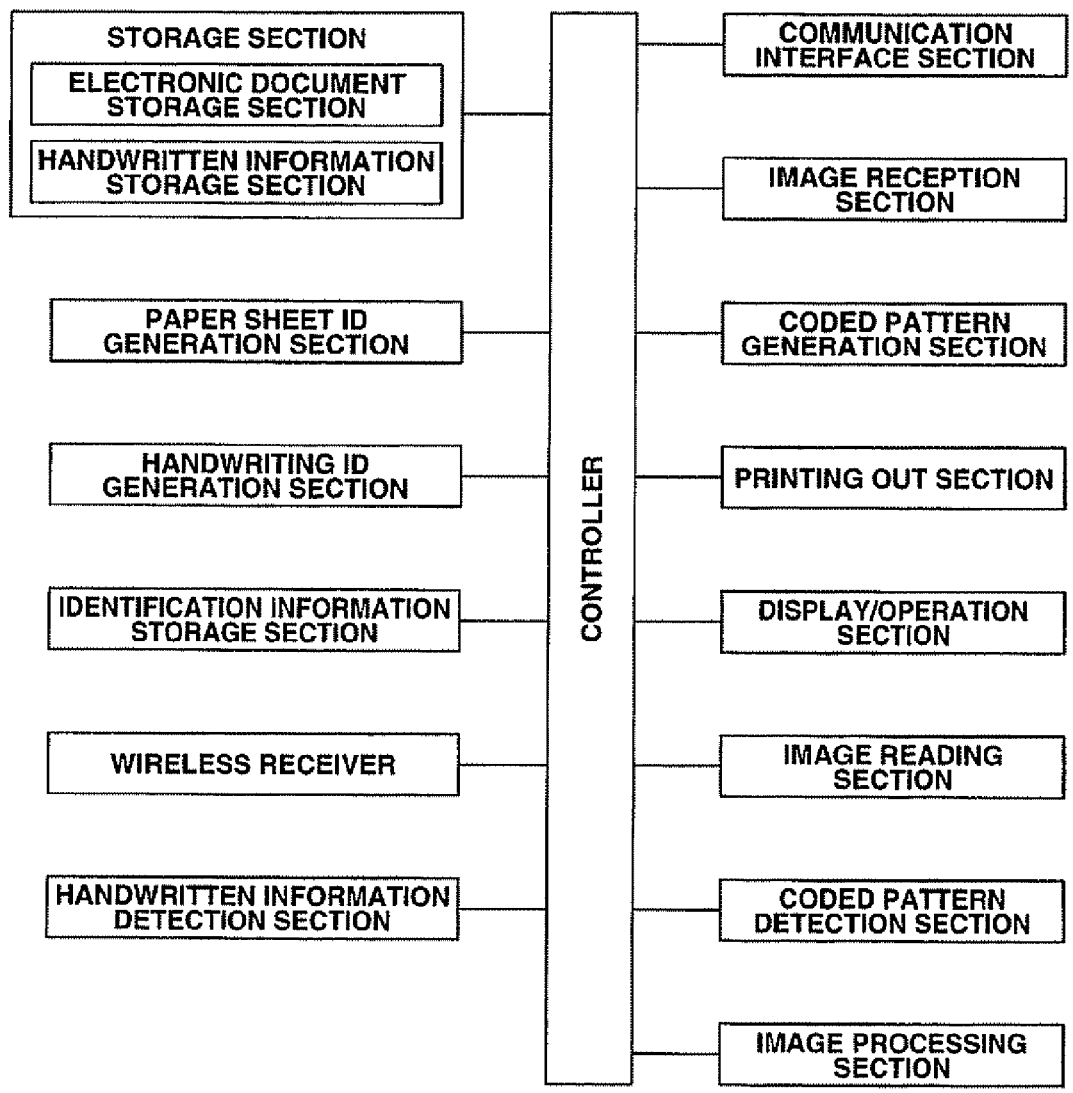
FIG. 16 is a block diagram showing a configuration of an image formation device having functions of the document management server 20 and the identification information management server 30, and a part of a function of a client PC 40.

It should be noted that it may be possible to employ a configuration in which the image formation device 10 performs functions of the document management server 20, the identification information management server 30 and the client PC 40 excluding the document generation function, by providing the image formation device 10 with functions of the storage section 203 (including the electronic document storage section 204 and the handwritten information storage section 205) provided to the document management server 20; the paper sheet ID generation section 302, the handwriting ID generation section 303 and the identification information storage section 305 provided to the identification information management server 30; and the wireless reception section 405 and the handwritten information detection section 406 provided to the client PC 40. In this case, the printing order to the electronic document stored in an element corresponding to the electronic document storage section 204 in the image formation device 10 is given by the display/operation section 106. Additionally, in this case, the output document selection screen as described above is also displayed on the display/operation section 106. The image formation device as configured above is shown in FIG. 16. FIG. 16 is a block diagram showing the image formation device including functions of: the storage section 203 (the electronic document storage section 204 and the handwritten information storage section 205) provided to the document management server 20; the paper sheet ID generation section 302, the handwriting ID generation section 303 and the identification information storage section 305 provided to the identification information management server 30; the wireless reception section 405 and the handwritten information detection section 406 provided to the client PC 40; and the controller 101, the communication interface 102, the image reception section 103, the coded pattern generation section 104, the printing out section 105, the display/operation section 106, the image reading section 107, the coded pattern detection section 108 and the image processing section 109 provided to the image formation device 10. As shown in FIG. 16, the image formation device includes: a storage section having a function of the storage section 203; a paper sheet ID generation section having a function of the paper sheet ID generation section 302; a handwriting ID generation section having a function of the handwriting ID generation section 303; an identification information storage section having a function of the identification information storage section 305; a wireless reception section having a function of the wireless reception section 405; a handwritten information detection section having a function of the handwritten information detection section 406; a controller having a function of the controller 101; a communication interface section having a function of the communication interface section 102; an image reception section having a function of the image reception section 103; a coded pattern generation section having a function of the coded pattern generation section 104; a printing out section having a function of the printing out section 105; a display/operation section having a function of the display/operation section 106; an image reading section having a function of the image reading section 107; a coded pattern detection section having a function of the coded pattern detection section 108; and an image processing section having a function of the image processing section 109.

The present invention is applicable to the handwritten information management system, the handwritten information management method and a recoding medium storing the handwritten information management program.

The foregoing description of the exemplary embodiment of the present invention is provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A handwritten information management system, comprising
    a paper sheet document generation section that generates a paper sheet document in which a plurality of pieces of coded information including coordinate information indicating a position on a paper sheet and document identification information of the paper sheet document formed on the paper sheet are recorded;
    a paper sheet document registration section that registers the paper sheet document generated by the paper sheet document generation section and an electronic document corresponding to the paper sheet document in correlation with the document identification information;
    a handwritten information detection section that detects handwritten information handwriting on the paper sheet document generated by the paper sheet document section;
    a handwritten information registration section that registers handwritten information identification information to identify the handwritten information in correlation with the handwritten information detected by the handwritten information detection section; and
    an identification information management section that manages the document identification information correlated with the paper sheet document registered by the paper sheet document registration section and the handwritten information identification information correlated with the handwritten information registered by the handwritten information registration section.

2. The handwritten information management system according to claim 1, further comprising:
    a document searching section that searches a desired electronic document based on the document identification information managed by the identification information management section;
    a handwritten information searching section that searches desired handwritten information based on the handwritten information identification information managed by the identification information management section; and
    a handwritten information generation section that superimposedly generates, based on the electronic document searched by the document searching section, an image corresponding to the electronic document and the handwritten information searched by the handwritten information searching section on the paper sheet in which the plurality of pieces of coded information including the coordinate information indicating the position on the paper sheet and the document identification information of the paper sheet document formed on the paper sheet are recorded.

3. The handwritten information management system according to claim 1, wherein
    the handwritten information detection section detects the handwritten information by reading the coordinate information included in the coded information recorded on the paper sheet.

4. The handwritten information management system according to claim 1, wherein
    the handwritten information registration section registers, corresponding to the handwritten information, attribute information including at least one of date and time when handwriting in connection with the handwritten information is made, a user who makes the handwriting and a history of the paper sheet document to which the handwriting is made.

5. The handwritten information management system according to claim 2, wherein
    the handwritten information generation section superimposedly generates the image corresponding to the handwritten information so as to recognize a difference from an image corresponding to the electronic document on the paper sheet.

6. The handwritten information management system according to claim 2, wherein
    the handwritten information generation section superimposedly generates the image corresponding to the handwritten information so as to identify an order in which the handwritten information is detected.

7. The handwritten information management system according to claim 2, wherein
    the handwritten information generation section superimposedly generates the image corresponding to the handwritten information based on attribute information.

8. A handwritten information management system, including
    a document management device that manages an electronic document and a paper sheet document generated from the electronic document in correlation with document identification information;
    a handwritten information management device that manages handwritten information written on the paper sheet document in correlation with handwritten information identification information;
    an identification information management device that manages the document identification information corresponding to the electronic document or the paper sheet document managed by the document management device, and the handwritten information identification information corresponding to the handwritten information managed by the handwritten information management device; and
    an document processing device, wherein
    the document processing device comprises:
    a paper sheet document generation section that generates a paper sheet document in which a plurality of pieces of coded information including coordinate information indicating a position on a paper sheet and document identification information of the paper sheet document formed on the paper sheet are recorded;
    a paper sheet document registration section that registers to the document management device the paper sheet document generated by the paper sheet document generation section and an electronic document corresponding to the paper sheet document in correlation with the document identification information;

a handwritten information detection section that detects handwritten information handwriting on the paper sheet document generated by the paper sheet document section;

a handwritten information registration section that registers handwritten information identification information to identify the handwritten information to the handwritten information management device in correlation with the handwritten information detected by the handwritten information detection section; and an identification information management section that causes the identification information management device to manage the document identification information correlated with the paper sheet document registered by the paper sheet document registration section and the handwritten information identification information correlated with the handwritten information registered by the handwritten information registration section.

9. A handwritten information management method, comprising:

generating a paper sheet document in which a plurality of pieces of coded information including coordinate information indicating a position on a paper sheet and document identification information of the paper sheet document formed on the paper sheet are recorded;

registering the generated paper sheet document and an electronic document corresponding to the paper sheet document in correlation with the document identification information;

detecting handwritten information handwriting on the generated paper sheet document;

registering handwritten information identification information to identify the handwritten information in correlation with the detected handwritten information; and managing the document identification information correlated with the registered paper sheet document and the registered handwritten information identification information correlated with the handwritten information.

10. A computer readable recording medium storing a handwritten information management program that causes a computer to execute a process, the process comprising:

generating a paper sheet document in which a plurality of pieces of coded information including coordinate information indicating a position on a paper sheet and document identification information of the paper sheet document formed on the paper sheet are recorded;

registering the generated paper sheet document and an electronic document corresponding to the paper sheet document in correlation with the document identification information;

detecting handwritten information handwriting on the generated paper sheet document;

registering handwritten information identification information to identify the handwritten information in correlation with the detected handwritten information; and managing the document identification information correlated with the registered paper sheet document and the registered handwritten information identification information correlated with the handwritten information.

\* \* \* \* \*